United States Patent

Covington

Patent Number: 5,833,843
Date of Patent: *Nov. 10, 1998

[54] ANTI-DRAIN BACK/PRESSURE RELIEVED FILTER CARTRIDGES

[75] Inventor: Edward A. Covington, Gastonia, N.C.

[73] Assignee: Dana Corporation, Toledo, Ohio

[*] Notice: The term of this patent shall not extend beyond the expiration date of Pat. No. 5,690,816.

[21] Appl. No.: 653,715

[22] Filed: May 23, 1996

Related U.S. Application Data

[63] Continuation-in-part of Ser. No. 556,595, Nov. 13, 1995, Pat. No. 5,690,816.

[51] Int. Cl.⁶ .................................................. B01D 35/147
[52] U.S. Cl. ...................... 210/130; 210/136; 210/429; 210/430
[58] Field of Search .................... 210/130, 136, 210/429, 430

[56] References Cited

U.S. PATENT DOCUMENTS

| | | | |
|---|---|---|---|
| 2,092,162 | 9/1959 | Humbert, Jr. et al. | 210/438 |
| 2,183,616 | 12/1939 | Korte | 210/165 |
| 2,937,756 | 5/1960 | Humbert, Jr. | 210/444 |
| 3,132,097 | 5/1964 | Tietz | 210/130 |
| 3,231,089 | 1/1966 | Thornton | 210/130 |
| 3,235,085 | 2/1966 | Humbert, Jr. | 210/130 |
| 3,243,045 | 3/1966 | Tietz | 210/130 |
| 3,305,095 | 2/1967 | Hathaway | 210/130 |
| 3,332,554 | 7/1967 | Humbert, Jr. | 210/130 |
| 3,529,722 | 9/1970 | Humbert, Jr. | 210/130 |
| 3,557,957 | 1/1971 | Baldwin | 210/130 |
| 3,567,023 | 3/1971 | Buckman et al. | 210/130 |
| 3,785,491 | 1/1974 | Dudinec et al. | 210/130 |
| 4,144,168 | 3/1979 | Thornton | 210/130 |
| 4,732,678 | 3/1988 | Humbert, Jr. | 210/440 |
| 4,872,976 | 10/1989 | Cudaback | 210/130 |
| 5,284,579 | 2/1994 | Covington | 210/130 |
| 5,405,527 | 4/1995 | Covington | 210/130 |

Primary Examiner—Matthew O. Savage
Attorney, Agent, or Firm—Millen, White, Zelano & Branigan, P.C.

[57] ABSTRACT

A spin-on filter including a combination anti-drainback and bypass valve is disclosed herein. The valve includes an annular valve support disposed between a filter element and an end plate of the filter. The valve support has an inner sleeve portion which seats about a central outlet of the end plate and an outer sleeve portion with holes therethrough. The valve member has an expandable collar portion which normally seals the bypass holes and functions as a bypass valve and a skirt portion with normally seals the inlet holes in the end plate and functions as an anti-drainback valve. The valve member is preferably made of a low swell silicone material which requires higher oil pressures to bypass the filter at low starting oil temperatures than at higher operating oil temperatures.

8 Claims, 5 Drawing Sheets

ANTI-DRAIN BACK/PRESSURE RELIEVED FILTER CARTRIDGES

RELATED PATENT APPLICATIONS

This application is a continuation-in-part of U.S. patent application Ser. No. 08/556,595, filed November 13, 1995 now U.S. Pat. No. 5,690,816.

FIELD OF THE INVENTION

The present invention relates to improvements in anti-drain back, pressure relieved, filter cartridges. More particularly, the present invention relates to improvements in valve configurations for such filter cartridges and in improvements in configurations for retaining annular filter elements and valve components within filter cartridges.

BACKGROUND OF THE INVENTION

Annular filter elements are mounted in filter housings to form replaceable filter cartridges which are threadably mounted on internal combustion engines. These cartridges are known as "spin-on filters" because they are threadably mounted and removable. If a customer follows the recommended procedures for changing the filter cartridge when lubricating oil is changed, then it is unusual for the filter to clog; however, if the customer fails to change the filter cartridge, or if the lubricating oil becomes contaminated for some other reason, the filter can become clogged or otherwise blocked as to minimize flow of lubricating oil to the engine. If this happens, an engine can be destroyed or seriously damaged.

In order to avoid or at least minimize damage, filter cartridges have been configured to allow oil to bypass filter elements in the cartridges when the filter elements become clogged. The engine is thereafter supplied with at least unfiltered lubricant rather than no lubricant at all, or insufficient lubricant. It is also desirable to keep oil within the filter cartridge when the engine is not running so that when the engine is started, there is no substantial gap in the flow of lubricating oil caused by a slight delay as the filter cartridge refills with oil. This is accomplished by providing an anti-drain back valve which closes when not subjected to pressure from the engine's oil pump so as to prevent draining of oil from the filter back toward the crank case.

Millions of filter cartridges are manufactured every year and millions are disposed of. Since these filter cartridges are disposable, reduction in their cost is highly desirable. One cost reduction approach is to reduce the number of parts and to simplify assembly. Heretofore this has been difficult to accomplish without compromising the effectiveness of the filter cartridges.

In cold environments, lower temperatures of lubricating oil and mechanical components result in higher oil pump pressure and increased filter resistance to flow due to higher lubricating oil viscosity. Current oil filters do not have by-pass valves which accommodate both high operating temperatures after warm up and low temperature, cold startups which are now designed to occur at higher valve opening pressures of 11–14 psi rather than 8–11 psi. The complexity of the situation is further increased because it is desirable after warm-up, that the opening pressure of the bypass valve return to 8–11 psi.

SUMMARY OF THE INVENTION

It is a feature of the present invention to provide a new and improved configuration for anti-drain back/pressure relieved filter cartridges which has an additional advantage that it will not starve an engine for lubricating oil at high temperatures while compensating for cold flow lubrication.

In accordance with the present invention, a bypass valve is disposed between intake and an outlet of a lubricating oil filter cartridge which allows oil to bypass a filter media if the filter media becomes clogged. The bypass valve opens at a higher pressure when the lubricating oil is cold than when it is warm or at operating temperature.

In another aspect of the present invention, a lubricating oil filter cartridge includes a housing with an annular filter element therein and an end plate, the end plate having inlet openings therethrough for allowing unfiltered lubricating oil to enter the housing and a central outlet for allowing filtered oil to pass out of the filter housing. In accordance with the present invention, the improvement comprises an annular valve support disposed between the end plate and the filter element, the annular valve element having an inner sleeve bearing against the end plate proximate the outlet and an outer sleeve with a plurality of holes therethrough for allowing lubricating oil to bypass the filter element when the holes are uncovered by an annular valve member. In order to support the annular filter element, the annular valve support further has a radially extending flange which underlies the annular filter element. The annular valve member has a flexible shirt which functions as an anti-drain back valve and an expandable collar fitting around the outer sleeve of the annular valve support to function as a bypass valve. In order to function as a bypass valve, the expandable collar normally covers the holes but and spreads to uncover the holes when the filter element becomes clogged. Consequently, unfiltered lubricating oil normally passes through the annular filter element, but when the filter element becomes clogged, bypasses the annular filter element and flows through the holes in the annular filter support.

In a further aspect of the invention, the annular valve member is disposed between the annular filter element and the outer sleeve of the annular valve support with the radially extending flap disposed between the radially extending flange of the annular valve support and the filter element.

In still a further aspect of the invention, the annular valve support is made of metal which may, for example, be steel or plastic.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

1) First Embodiment—FIGS. 1–9

Figure 1:
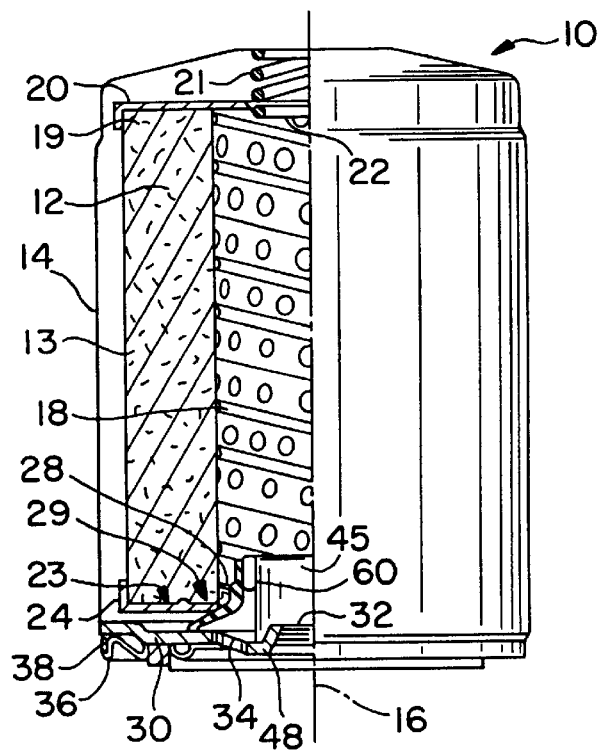
FIG. 1 is a side view, partially in section, of a first embodiment of an anti-drain back/pressure relieved filter cartridge configured in accordance with the principles of the present invention, showing the filter cartridge in an anti-drain back mode when the filter is connected to an engine which is not running.

Referring now to FIG. 1, there is shown a lubricating oil filter cartridge 10 configured in accordance with the present invention, wherein the cartridge comprises an annular filter element 12 configured of a conventional pleated paper filament media 13, or some other filter material, contained within a cylindrical housing 14. The annular filter element 12 is concentric with respect to an axis 16 of the cartridge 10 and has a hollow core 18.

Figure 2:
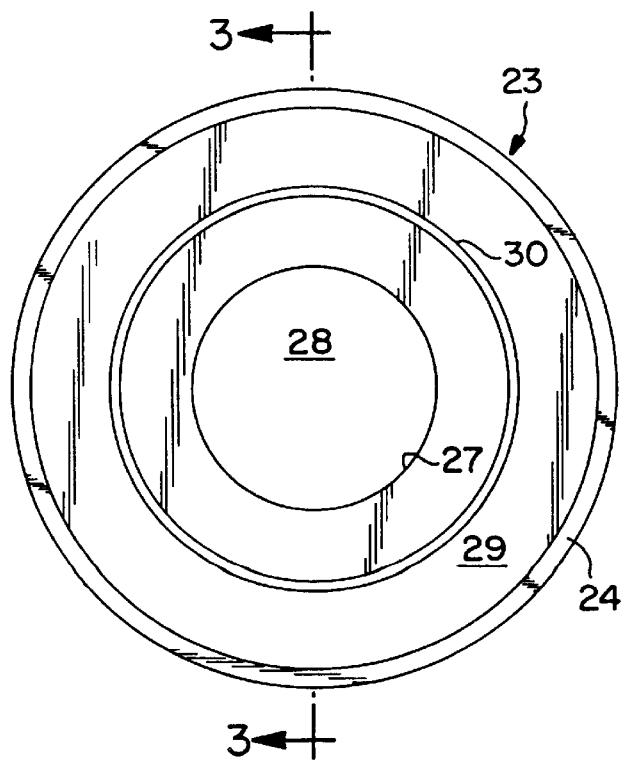
FIG. 2 is an end view of a bottom end cap used with a filter element supported in the filter cartridge of FIGS. 1–3.
Figure 3:
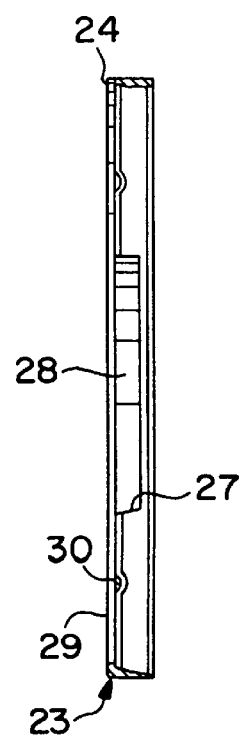
FIG. 3 is a side elevation of the end cap of FIG. 2 taken along lines 3—3 of FIG. 2.

The annular filter element 12 has a first end 19 configured as a closed, dished end cap 20 which is abutted by a spring 21 that is seated in a depression 22 within the closed, dished end cap (see FIGS. 2 and 3). At the second end of the annular filter element 12, there is an annular end cap 23 having an outer axial flange 24 and an inner axial flange 27 surrounding a central opening 28. The inner axial flange 27 is aligned with the hollow core 18 of the filter element. The inner and outer axial flanges are connected to one another via a radially extending plate 29 which has an annular stiffening offset therein.

An end plate 30 encloses the filter element 12 in the housing 14. The end plate 30 includes a threaded outlet 32, coaxial with the axis 16 of the filter cartridge 10 and a plurality of inlet openings 34 (only one of which is shown) disposed in spaced relation with one another around the axis 16 of the cartridge 10. The end cap 30 is held proximate the end of the housing by a cover 36 which is crimped to the bottom end of the housing 14 by a peripheral crimp 38. An annular seal 40 seals the inlet openings 34 with respect to the environment surrounding the filter cartridge 10.

Figure 4:
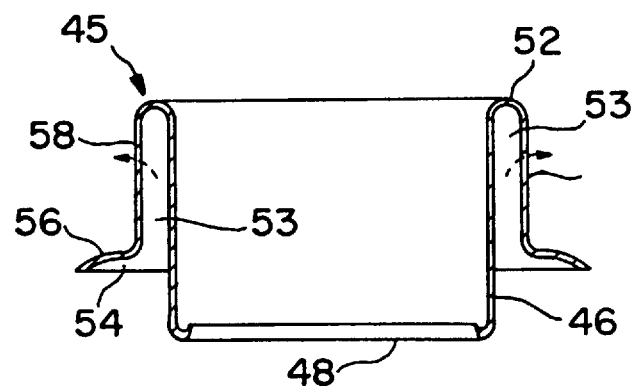
FIG. 4 is a side elevation of a combination valve member and filter element support.
Figure 5:
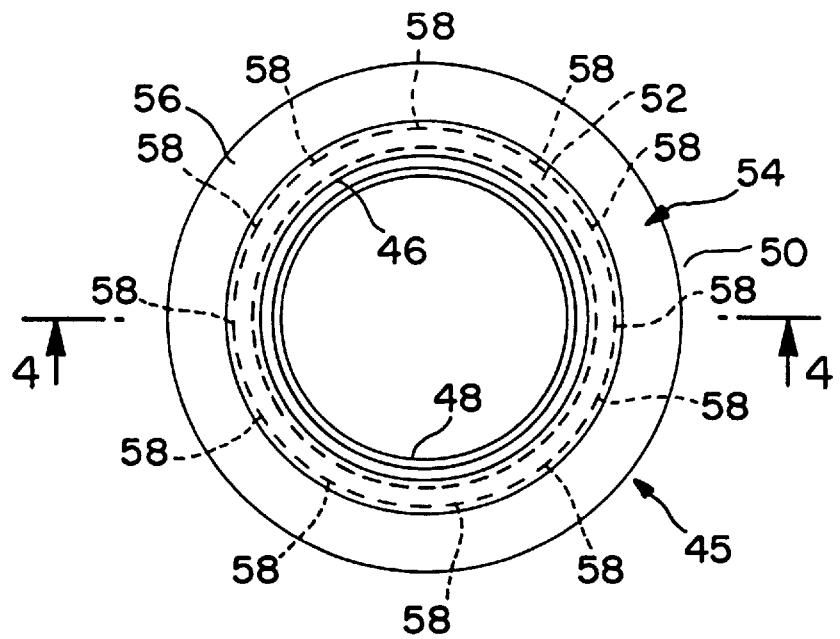
FIG. 5 is an end view of the support of FIG. 4.

Referring now mainly to FIGS. 4 and 5, there is shown a combination valve member and filter element support 45 preferably made of metal. The support 45 has an inner sleeve 46 with an annular rolled stiffener 48 and an outer sleeve 50 which is connected to the inner sleeve by an annular, arcuate bight 52. The outer sleeve 50 has a radial flange 54 extending outwardly therefrom, the radial flange terminating in an upper convex surface 56.

Referring now to FIG. 1 in combination with FIGS. 4 and 5, it is seen that the filter and valve member support 45 is seated against the end plate 30 co-axially with the internally threaded outlet 32. The rolled end stiffener 48 forms an annular foot surrounding the outlet 32. As will be explained in more detail hereinafter, the inner and outer sleeves 46 and 50 of the support 45 are received within the central opening 28 of the end cap 23 shown in FIGS. 2 and 3. The end cap 23 also overlies the radial flange 54 of the combined valve member and filter element support 45.

Figure 6:
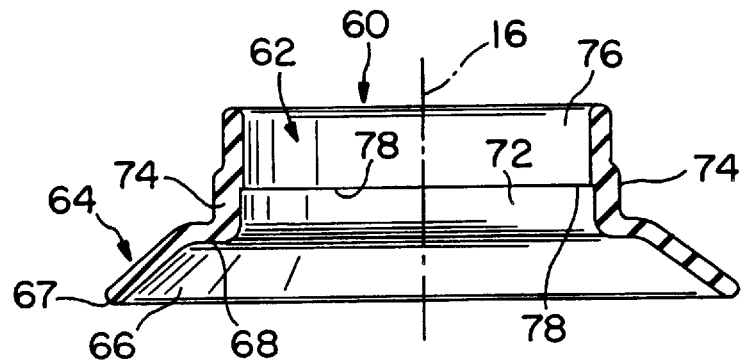
FIG. 6 is a side elevation of an annular valve member incorporating the features of the first embodiment of the present invention which is supported by the annular filter element and valve member support of FIGS. 4 and 5.
Figure 7:
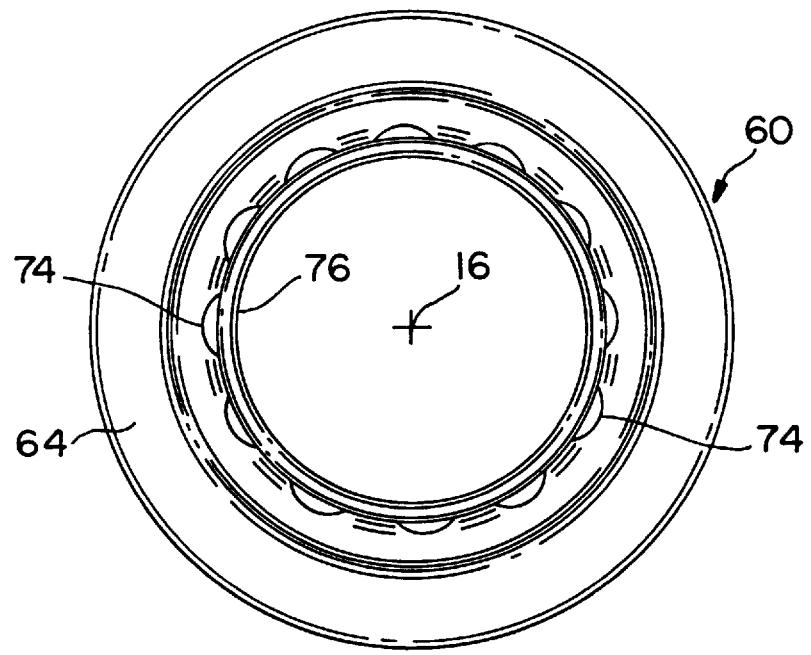
FIG. 7 is a top view of the valve member of FIG. 6.

Referring now to FIGS. 6 and 7, there Is shown a valve member 60 which is comprised of an expandable collar portion 62 and a skirt portion 64. The collar 62 is preferably made of a material such as Goshen 2624 which is a rubber material available from the Goshen Rubber Company. The skirt 64 has a frustoconical portion 66 which has a periphery 67 and a generally radial section 68 that joins the frustoconical section to the expandable collar portion 62. Disposed around the exterior of the radial collar portion 62 and a lower section 72 thereof are a plurality of ribs 74. The ribs 74 extend slightly past the lower portion 72 of the expandable collar to overlie an upper portion 76. The upper portion 76 is separated from the lower portion of the expandable collar 62 by a very narrow annular shoulder 78. The upper portion has an inner diameter of about $\frac{1}{100}$ths of an inch less than the lower portion 72.

Figure 8:
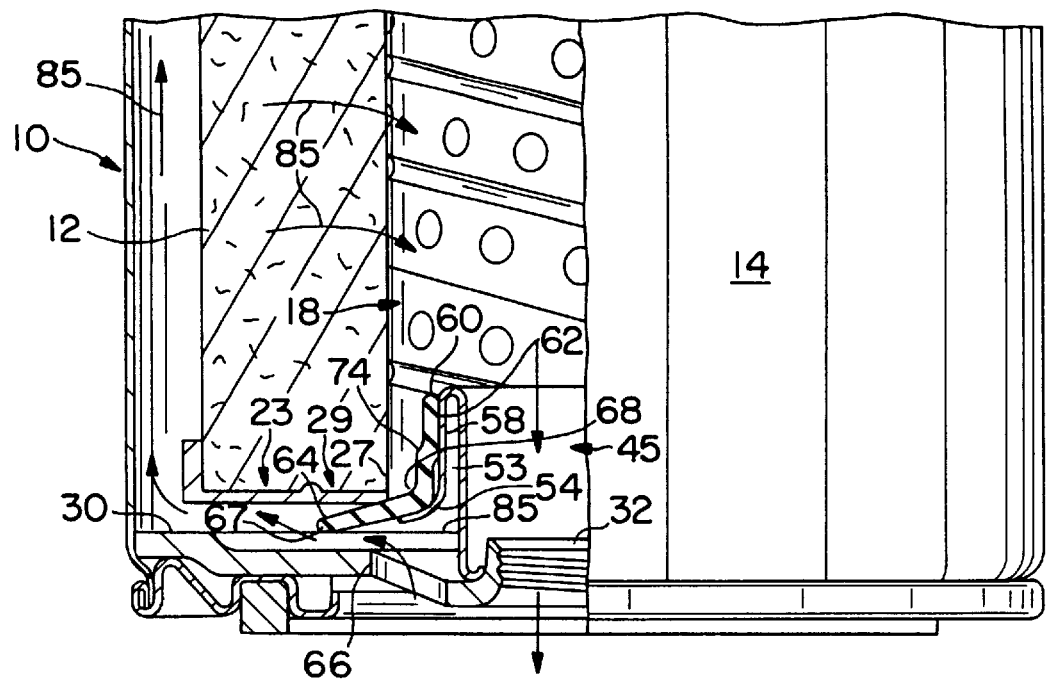
FIG. 8 is an enlarged view of a portion of the filter cartridge of FIG. 1, but showing the filter cartridge in an active mode filtering lubricating oil circulating in an operating engine.
Figure 9:
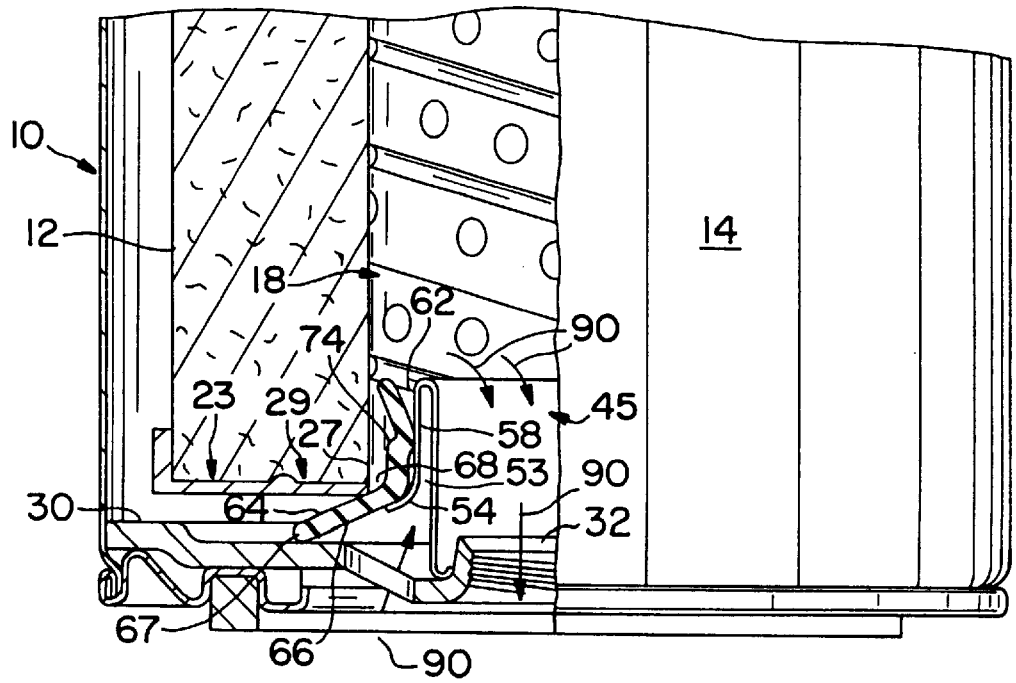
FIG. 9 is a view similar to FIG. 8, but showing the filter cartridge operating in a bypass mode when the filter element is clogged.

The valve member 60 of FIGS. 7 and 8 fits over the combined valve member and filter element support 45 of FIGS. 4 and 5 and, as is seen in FIGS. 1 has the annular end cap 23 of the filter element 12 urged thereagainst by the coil spring 21. As is best seen in FIGS. 8 and 9, the inner axial flange 27 of the end cap 23 is adjacent the ribs 74 on the expandable collar 62 and an inner peripheral portion of the plate 29 abuts the radially extending portion 68 of the skirt 64. The frustoconical portion 66 of the skirt 64 drapes over the upper convex surface 56 of the radial flange 54 with the peripheral end 67 of the skirt resting on the end plate 30.

Normally, when the engine (not shown) to which the canister 10 is connected is not operating (see FIG. 1), lubricating oil in the canister is retained in the canister by the skirt 64 because the frustoconical portion 66 of the skirt prevents lubricating oil from flowing out of the inlet holes 34. Accordingly, the skirt 64 functions as an anti-drain back valve.

As is seen in FIG. 8, when the engine is running, the frustoconical portion 66 of the skirt 64 deflects upwardly, allowing lubricating oil to flow in the direction of the arrows 85, wherein the lubricating oil flows around the outside of the filter element 12 and is forced radially there-through into the hollow core 18 of the filter element, from which it then flows through the internally threaded out 32 and out of the filter cartridge 10.

When the filter element 12 becomes clogged, then the oil cannot follow the path of the arrows 85, because the oil cannot pass through the filter media 13 comprising the filter element 12. This forces the oil to apply pressure in the space 53 between the inner sleeve 46 and outer sleeve 50. Pressure in the space 53 is also applied through the series of holes 58 to the upper portion 76 of the expandable collar 62.

As is seen in FIG. 9, when the filter element 12 becomes clogged, the expandable collar 62 deflects radially outwardly and the oil follows the direction of the arrows 90, through the holes 58 and into the hollow core 18 of the filter element 12. From the hollow core of the filter element 12, the oil exits through central outlet 32 and is pumped back to the engine without being filtered. While a lubricating oil following the direction of the arrows 90 is unfiltered, it still provides lubricant to the associated engine. This is of course preferable to the engine receiving no lubricant at all due to the filter element 12 being clogged. When the engine is stopped, the upper portion 76 of the expandable collar 62 retracts to its normal position of FIG. 1, sealing the holes 58 to prevent oil from draining from the filter cartridge 10.

With the aforedescribed arrangement, the unitary valve member 60 performs both the pressure relief and anti-drain back functions without the need for an additional spring. By making the valve member 60 of a material such as the preferred material, Goshen 2624, the bias necessary to close the valve member is unitary with its structure.

2) Second Embodiment—FIGS. 10–13

Figure 10:
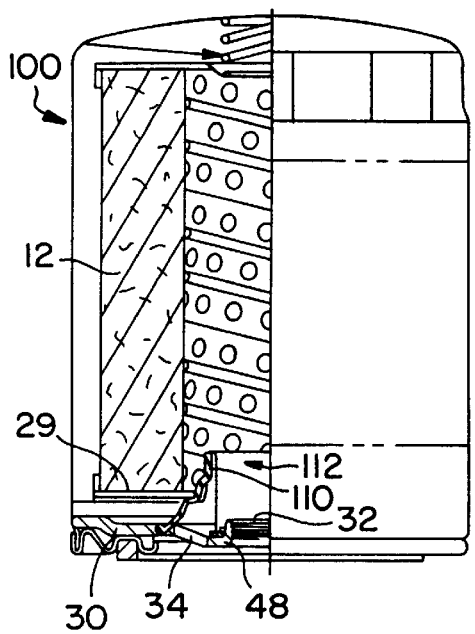
FIG. 10 is a side view, partially in elevation, similar to FIG. 1, but showing a second embodiment of the annular valve member incorporated in the anti-drain back, pressure relieved, filter cartridge of FIG. 1.
Figure 11:
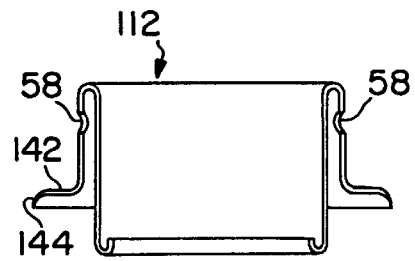
FIG. 11 is a view similar to FIG. 4 of a side elevation of a combination valve member and filter element support for supporting the second embodiment of the annular valve member shown in FIGS. 10, 12 and 13.

Referring now to FIG. 10, FIG. 10 illustrates a second and preferred embodiment of the invention, in which an annular valve member 110 mounted in an anti-drain back, pressure relieved, filter cartridge 100 has a different configuration from the annular valve member 60 of FIGS. 1 and 6–9. The annular valve member 110 is mounted on a combination valve member and filter element support 112 which is similar but not identical to the support 45 in FIGS. 1, 4, 5, 8 and 9. As is seen in FIG. 10, the annular valve member 1 10 generally has a thinner cross-section than the annular valve member 60 while the support 112 has a depending lip 142 which has a smaller radius and slopes downwardly at a steeper angle (see FIG. 11) than the support 45 of FIGS. 4 and 5.

Figure 12:
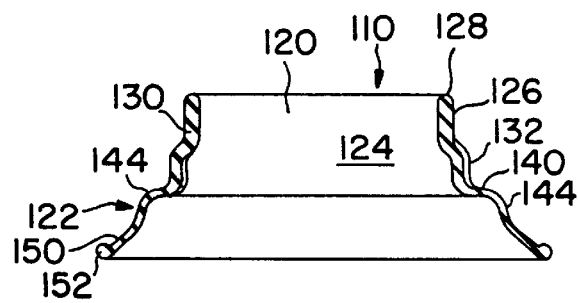
FIG. 12 is a side elevation, similar to FIG. 6, but showing the second embodiment of the annular valve member.
Figure 13:
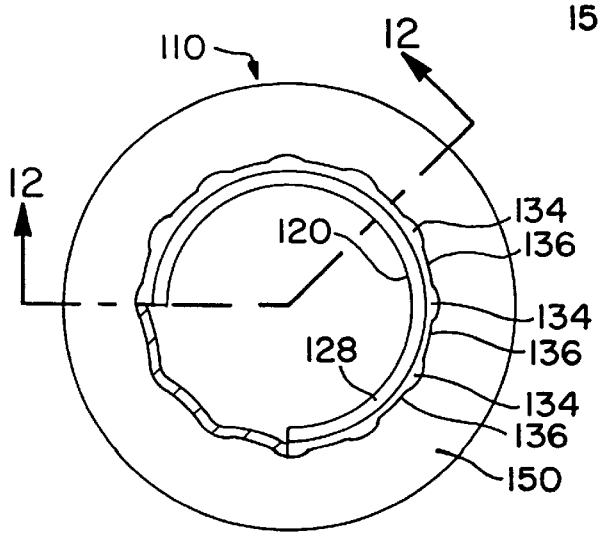
FIG. 13 is a top view, similar to FIG. 7, but showing the second embodiment of the valve member of FIG. 12.

Referring now more specifically to FIGS. 12 and 13, it is seen that the annular valve member 110 includes an expandable collar portion 120 and a skirt 122. The expandable collar portion 120 has a cylindrical inner surface 124 and a cylindrical outer surface 126. The expandable collar portion 120 deflects in substantially the same way as the expandable collar portion 62 deflects from the closed position of FIG. 8 to the open position of FIG. 9. The closed position of FIG. 8 is the position of the collar portion 120 when the filter media 12 is not clogged and the open position of FIG. 9 is the position of the collar portion when the filter media is clogged. The expandable collar 120 deflects with the top edge 128 moving outwardly to uncover the openings 58 in the filter element support 112 when the filter media 12 is clogged and the lubricating oil pressurized. The openings 58 and the support 112 (FIG. 11) correspond to the openings 58 in the support 54 (FIGS. 4 and 5).

In accordance with the second embodiment of the invention, the entire annular valve member 110 is molded of a low swell silicon elastomer. It has been found that a preferred silicon elastomer is Jasper 4229 silicone which is compression molded. By using Jasper 4229 SILICONE available from the Jasper Rubber Company to mold the annular valve 110, the annular valve 110 functions properly when the filter media 12 is clogged in both a cold-flow mode and a normal operating temperature mode.

Collar portion 120 of the annular valve 110 has an outside diameter of about 1.250 inches and an inside diameter of about 1.100 inches, giving the wall of the collar portion a thickness of about 0.150 inch. The collar portion 120 has a height of about 0.192 inch and at its base portion 130 joins a ribbed portion 132.

The ribbed portion 132 includes a plurality of ribs 134 joined by valleys 136. The ribbed portion flares slightly to a diameter of about 1.382 inches and joins a shelf portion 140. The shelf portion 140 rests on a corresponding lip 142 (see FIG. 11) of the support and is held thereagainst by the radially extending end plate 29 which closes the end of the filter media 12. The ribs 132 extend from the shelf 140 back toward the cylindrical portion 120 to stiffen the annular valve 110 and allow flexure at the base 130 of the annular collar 120. Depending from the shelf portion 140, in the opposite direction of the base 130 is a curved portion 144 which drapes over the curved lip 142 (see FIG. 11) of the valve support 112. The curvature of the curved portion 144 has a radius of about 0.078 inches.

While in the illustrated embodiment, the collar 126 covers the holes 58. It is not necessary that the collar 58 overlie the holes directly but only that it block communication between the holes and the hollow core 18 of the filter element 12.

Consequently, the holes 58 can be positioned lower in the area of ribs 134 and not directly covered or sealed.

Projecting unsupported from the curved portion 144 is a skirt portion 150 which forms the anti-drain back valve. The skirt portion 150 has a bead 152 at the end thereof which engages the end cap 30 of the filter assembly 100. In its relaxed state, the skirt portion 150 has a diameter of about 2.100 inches and flares from the curved portion 144 about a radius of about 0.125 inch. When installed, the skirt portion 150 is deflected upwardly so that it is constantly under a bias to close the inlet ports 34 in the end plate 30. As is seen in FIG. 12, the skirt portion 150 is considerably thinner than the expandable collar portion 112 and has, in a preferred embodiment, a thickness of about 0.030 inch.

As with the embodiment of FIGS. 1–9, the valve skirt portion 150 may be deleted in situations where no anti-drain back function is desired.

By molding the annular valve 110 of low swell silicone materials, such as Jasper 4229 SILICONE, and properly dimensioning the collar portion 120, the valve compensates for cold flow filtration while not starving the engine for oil at high temperatures when the filter medium becomes clogged. Further to this point, original equipment engine manufacturers are raising opening pressures of bypass valves for filters which filter lubricating oil. This is due to higher flow rates of unfiltered oil during cold starts. During normal operating temperatures, the opening pressure is in the range of about 8–10 psi, but for cold starts, new design parameters specify opening pressures in the range of about 11–14 psi. The annular valve of FIGS. 12 and 13 accommodates this situation by utilizing low swell silicone which increases in elasticity as the temperature rises.

In cold environments, low temperatures of lubricating oil and mechanical components increases oil viscosity, resulting in oil pumps producing higher pressures. The silicone elastomer of the valve 112 increases in elastic modulus and temperature strength as temperatures drop, resulting in higher opening pressures of, for example, 11–14 psi at temperatures of, for example, −30° F and lower opening pressures at engine operating temperatures of 180° F. Typically, this standard opening pressure at 180° F of a warmed up engine is in the range of 8–10 psi. By utilizing the second embodiment of the invention, when a filter media 12 becomes clogged, bypass of the filter media is effective over a wide temperature range to minimize engine damage due to uncirculated lubricant.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a lubricating oil filter cartridge, a housing with an annular filter element therein; the annular filter element having a hollow core, the housing including an end plate having a central outlet therethrough surrounded by a plurality of inlet openings for allowing lubricating oil to enter the housing through the inlet openings in the end plate, to flow through the filter element to the hollow core thereof and to flow out of the filter element through the central outlet, the improvement comprising:

an annular valve support disposed between the end plate and the filter element, the annular valve support having an inner sleeve bearing against the end plate proximate the outlet and an outer sleeve spaced from the inner sleeve and including a plurality of holes therethrough, the outer sleeve having a radially extending flange extending outwardly therefrom for supporting the annular filter element; and an annular valve member made of a resilient resinous material and having a radially extending skirt overlying the inlet openings in the end plate, the radially extending skirt functioning as an anti-drain back valve by preventing oil from flowing out of the filter through the inlet openings while allowing oil under pressure to deflect the skirt and to flow pass the annular valve member and through the annular filter element when the annular filter element is not clogged, the valve member further including an expandable collar fitting around the outer sleeve and blocking communication between the holes and the hollow core of the holes, the expandable collar including a plurality of ribs disposed between the skirt and expandable collar for stiffening the collar, the collar spreading to uncover the holes when the filter element is clogged so that liquid can flow through the holes in the outer sleeve and through the central outlet to bypass the clogged filter.

2. The improvement of claim 1, wherein the annular valve member is disposed between the filter element and the outer sleeve of the valve support.

3. The improvement of claim 2, wherein the filter element has an end cap with an inner axially extending flange, the inner axially extending flange of the end cap engaging the expandable collar.

4. The improvement of claim 1, wherein the expandable collar is cylindrical and terminates outside of the outer sleeve of the annular valve support.

5. The improvement of claim 4, wherein the valve member is made of a resilient resinous material.

6. The improvement of claim 5, wherein the annular valve support is made of steel or plastic.

7. The improvement of claim 1, wherein the annular valve support is made of steel or plastic.

8. In a lubricating oil filter cartridge, a housing with an annular filter element therein;

the annular filter element having a hollow core and an annular end cap having an inner flange extending into the hollow core, the housing including an end plate having a central outlet therethrough surrounded by a plurality of inlet openings for allowing lubricating oil to enter the housing through the inlet openings in the end plate, to flow through the filter element to the hollow core thereof and to flow out of the filter element through the central outlet, the improvement comprising:

an annular valve support disposed between the end plate and the filter element, the annular valve support having an inner sleeve bearing against the end plate proximate the outlet and an outer sleeve spaced from the inner sleeve and including a plurality of holes therethrough, the outer sleeve having a radially extending flange extending outwardly therefrom for supporting the annular filter element; and an annular valve member disposed between the filter element and the outer sleeve of the valve support and having a radially extending skirt overlying the inlet openings in the end plate, the radially extending skirt functioning as an anti-drain back valve by preventing oil from flowing out of the filter and through the inlet openings while allowing oil under pressure to deflect the flaps and to flow part the annular valve member and through the annular filter element when the annular filter element is not clogged, the valve member further including an expandable collar fitting around the outer sleeve and covering the holes, the expandable collar having a circumference including a plurality of axially extending ribs disposed in spaced relation around the circumference with ribs engaging the inner axially extending flange of the annular end cap, the expandable collar spreading to uncover the holes when the filter element is clogged so that liquid can flow through the holes in the outer sleeve and through the central outlet to bypass the clogged filter.

* * * * *